US011539710B2

(12) United States Patent
Gambhir et al.

(10) Patent No.: US 11,539,710 B2
(45) Date of Patent: Dec. 27, 2022

(54) SYSTEM RESILIENCY WITH TEMPORARY ACCESS

(71) Applicant: Disney Enterprises, Inc., Burbank, CA (US)

(72) Inventors: Pankaj Gambhir, Ho-Ho-Kus, NJ (US); Sean T. Curtis, Rockville Centre, NY (US); Mahesh Swaminathan, Elmsford, NY (US); Kai Wang, Princeton, NJ (US); Krutarth Patel, Harrison, NJ (US)

(73) Assignee: Disney Enterprises, Inc., Burbank, CA (US)

( * ) Notice: Subject to any disclaimer, the term of this patent is extended or adjusted under 35 U.S.C. 154(b) by 1 day.

(21) Appl. No.: 17/320,029

(22) Filed: May 13, 2021

(65) Prior Publication Data

US 2022/0014528 A1    Jan. 13, 2022

Related U.S. Application Data

(60) Provisional application No. 63/051,291, filed on Jul. 13, 2020.

(51) Int. Cl.
*H04L 29/06*    (2006.01)
*H04L 29/08*    (2006.01)
*H04L 9/40*    (2022.01)
*H04L 67/141*    (2022.01)

(52) U.S. Cl.
CPC .......... *H04L 63/105* (2013.01); *H04L 63/104* (2013.01); *H04L 63/108* (2013.01); *H04L 67/141* (2013.01)

(58) Field of Classification Search
CPC ... H04L 63/105; H04L 63/104; H04L 63/108; H04L 63/10; H04L 67/141; H04L 67/142
USPC ........................................................... 726/26
See application file for complete search history.

(56) References Cited

U.S. PATENT DOCUMENTS

| 9,641,880 B1* | 5/2017 | Scurtu .............. H04N 21/47211 |
| 2008/0134347 A1* | 6/2008 | Goyal .................. G06F 21/606 |
| | | 726/29 |
| 2012/0260322 A1* | 10/2012 | Logan ..................... G06F 21/33 |
| | | 726/6 |
| 2017/0078275 A1* | 3/2017 | Slovetskiy ....... H04N 21/43615 |
| 2017/0257363 A1* | 9/2017 | Franke ................ H04W 12/069 |
| 2017/0337355 A1* | 11/2017 | Biswas ................... H04L 67/01 |

(Continued)

FOREIGN PATENT DOCUMENTS

WO    WO-2019015739 A1 *  1/2019    ......... H04L 63/0457

*Primary Examiner* — Ruolei Zong

(74) *Attorney, Agent, or Firm* — Farjami & Farjami LLP

(57) ABSTRACT

A method for use by a system computer for granting access to a network resource includes receiving, in a first session, a first request for accessing the network resource, the first request including authorization information of a user of an access computer, initiating, while in the first session and using the first authorization information, a first authorization process with one or more authorization computers, and determining a failure relating to the first authorization process initiated with the one or more authorization computers. The method further includes, upon determining the failure, sending a second request indicating a temporary access token is to be delivered to the access computer in response to an access computer executing a session refresh for initiating a second session.

20 Claims, 4 Drawing Sheets

(56) References Cited

U.S. PATENT DOCUMENTS

2019/0272537 A1\* 9/2019 Miller .................. G06Q 20/389
2021/0233045 A1\* 7/2021 Singh .................... G06Q 20/12

\* cited by examiner

SYSTEM RESILIENCY WITH TEMPORARY ACCESS

RELATED APPLICATION(S)

The present application claims the benefit of and priority to U.S. Provisional Patent Application Ser. No. 63/051,291, filed Jul. 13, 2020, and titled "System Resiliency with Temporary Access," which is hereby incorporated fully by reference into the present application.

BACKGROUND

Highly distributed systems play an important role in keeping systems scalable, functional, and resilient, which can be quite beneficial over monolithic systems. However, when failures are poorly addressed, a suboptimal user experience may result. For example, when a component within a distributed system fails, it is suboptimal to place a user in a waiting room or to force the user to retry their request. Furthermore, it is difficult to troubleshoot systems when several users are requesting access to a network resource concurrently. For example, when millions of users are signing up for a service within a short window of time, thousands of system errors may potentially occur all at once, thus resulting in extensive downtime required to analyze and resolve such issues.

DETAILED DESCRIPTION

Figure 1:
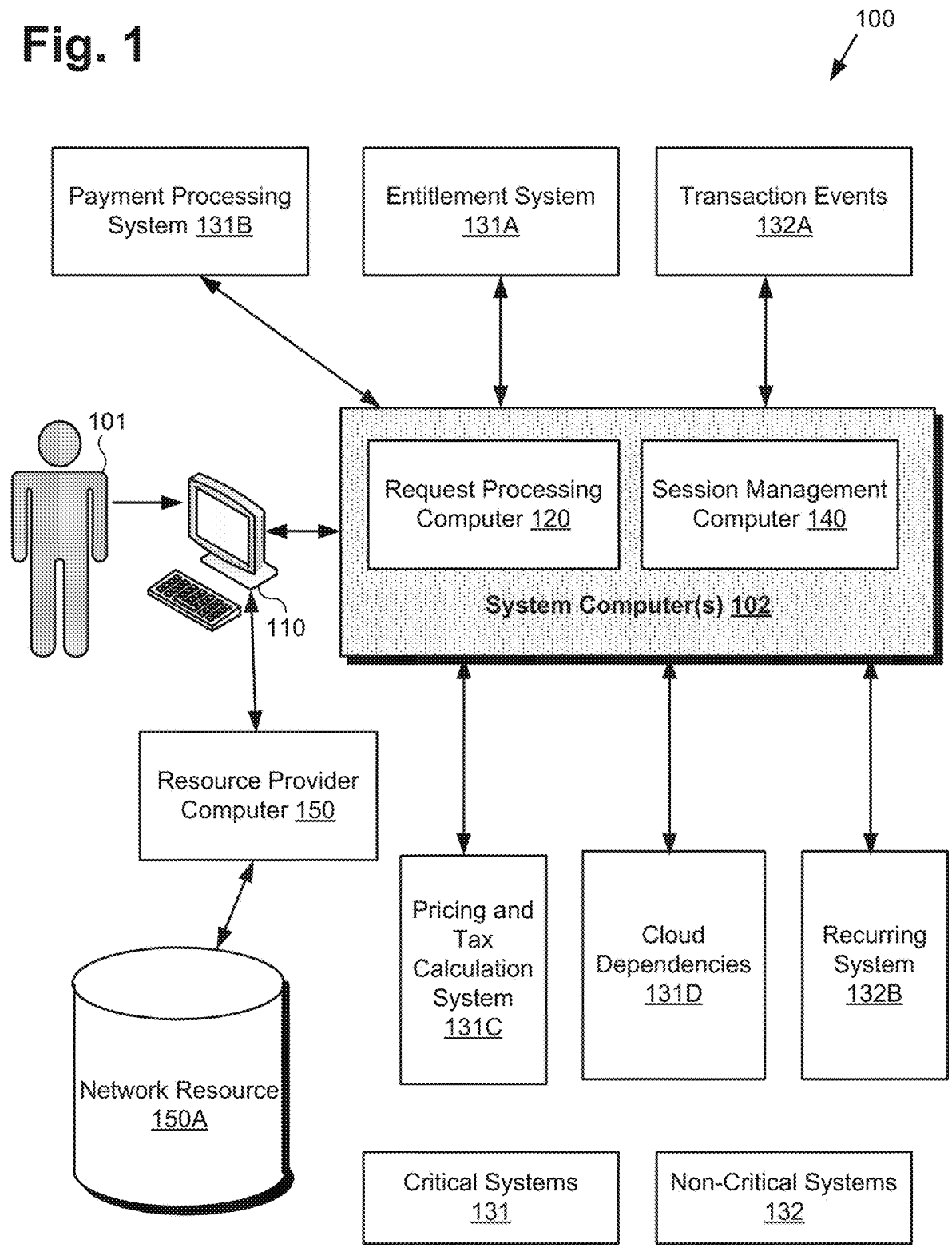
FIG. 1 shows an exemplary system for providing access to a network resource, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals.

The present disclosure relates to methods and systems for resilient authorization of access to network resources. Implementations of the present disclosure generally provide system resiliency in an effort to improve user experience on a digital platform, namely a digital platform for receiving network resources, such as digital streaming content. A growing user base on such platforms can create technical hurdles. One such hurdle is the ability to provide responses to requests and expedient authorization for access, such as in the case of order requests, subscription requests, purchase processing, and payment processing.

Access to the described network resources may typically require an authorization process that is highly distributed amongst various computers or servers in a network. For example, access may typically be granted based on the presence of an "entitlement" that is associated with the user and stored on the user's device so that content may continue to stream. A failure on the part of a critical component in the distributed authorization process (e.g., during payment processing, tax calculation, or other cloud service) may prevent or delay the entitlement from being delivered. It is normal to expect issues at any hour, such as third party dependency failures, cloud services failures, network failures, system failures due to bugs, and the like. However, keeping user experience and system resiliency as a goal, it is important that such failures do not negatively impact a user's request for access.

Implementations described herein provide system resiliency, while ensuring smooth transitions for a user to access the resource and become an authorized user on the digital platform. In case of failures that degrade the backend system and worsen user experience, the digital platform provides temporary access to the user while the backend system fixes itself, thus resulting in a smoother authorization experience for the user.

In one implementation, an asynchronous billing system provides an uninterrupted experience to a user in the face of dependency failures.

In one implementation, an asynchronous billing system may detect failure at the individual request level. In this implementation, a passive or transactional mode of access may be triggered.

In one implementation, the asynchronous billing system may detect failure at the aggregate request level. In this implementation, an active or global mode of access may be triggered.

In one implementation, a temporary access token is provided for uninterrupted access authorization.

In one implementation, a transaction is retried as soon as a critical authorization failure is resolved.

In one implementation, a temporary access token provides a user with access to the network resource (e.g., watch/stream digital content) on the platform for a predetermined period of time. The period of time may be configurable. For example, the duration of validity of the temporary access token may be based on a conservative estimate for how long it may take for a critical authorization failure to resolve (e.g., 4 hours, 8 hours, etc.). In some implementations, the critical authorization failure is resolved before the temporary access token expires. A configurable entity in the backend system may control how long a user maintains temporary access.

When a user, sometimes referred to herein as a "customer", attempts to purchase a subscription, there may be multiple systems or multiple authorization components involved in the authorization process to complete the user's purchase or other request for access. Some of these systems/components may include integrations with third party services, such as calculating applicable tax before charging the user, executing payment with appropriate payment processors, and internal services dependency. Any of these systems may fail, become overloaded, or otherwise function unexpectedly, thereby resulting in a negative user impact. Implementations described herein, provide a method of granting access that encapsulates such failures in the form of granting a temporary entitlement or "temporary access token" to the user while the backend system (e.g., a centralized system computer) retries authorization of the user's request asynchronously.

FIG. 1 shows one or more system computers (hereinafter "system computer(s) 102") for providing access to a network resource. System computer(s) 102 may include request processing computer 120 and session management computer 140, for example. System computer(s) 102 may be utilized in use environment 100 including one or more access computers 110 (hereinafter "access computer(s) 110"), one or more users 101 (hereinafter "user(s) 101"), a resource provider computer 150, a network resource 150A, and a plurality of authorization computers including critical authorization computers 131 and noncritical authorization computers 132. In one implementation, the request processing computer 120 may be implemented as an order processing system. In various implementations, the critical authorization computers 131 may include an entitlement system or entitlement computer 131A. The critical authorization computers 131 may additionally include first critical authorization computer 131B, second critical authorization computer 131C, third critical authorization computer 131C, fourth critical authorization computer 131D, which in some implementations, may be a payment processing system, a pricing and tax calculation system, and cloud dependencies, respectively. The noncritical authorization computers 132 may include first noncritical authorization computers 132A and second nonrecurring authorization computers 132B, which in some implementations, may include transaction events and a recurring system, respectively. In some implementations, the access computer(s) 110 may be used by user(s) 101 to communicate with the system computer(s) 102 over a network, such as the Internet. Although only one user 101 and one access computer 110 is shown in FIG. 1, use environment 100 may include multiple users and multiple access computers, which may each be used to communicate with the system computer(s) 102. As described herein, access computer(s) 110 may sometimes be referred to as "client device(s)" or simply "client(s)."

In one implementation, the network resource 150A may be digital content, which may be distributed or "streamed" to the access computer(s) 110 for viewing by the user(s) 101. In other implementations, the network resource 150A may include other forms of authorization-protected material, such as private data in a corporate network, materials in network libraries, education material, or news material, to name a few non-limiting examples. In one implementation, the resource provider computer 150 may be programmed to provide the content for distribution or streaming based on a subscription service that is purchased by the user(s) 101 and which entitles the user(s) 101 to the content (e.g., a monthly subscription plan to access the content, a pay-per-view plan to access content, or other time-based or per-resource based access plan). The subscription may be ordered and purchased by the user(s) 101, through an authorization process (e.g., a payment process), in which the user provides authorization information (e.g., payment details, such as payment card information, bank account information, or other payment credentials). Upon successful authorization of the authorization information of the users) 101 (e.g., successful processing of the payment information of the user(s) 101), the subscription plan may be associated with the user(s) 101 by the entitlement computer 131A. For example, if the user(s) 101 purchase(s) a one year subscription, the user(s) 101 may be entitled to receive the content for the period of one year after the date of purchase. The resource provider computer 150 may be configured to check for an "entitlement" or token on the access computer(s) 110, which indicates that the user has purchased a subscription and should be granted access to stream the content.

As previously explained, a failure or delay at any one of the critical authorization computers 131 may prevent the user(s) 101 from receiving an entitlement, thus being unable to access the network resource, thereby ruining the user experience even when it is not the fault of user(s) 101. For example, the user(s) 101 may be forced to wait or continuously retry their purchase order, despite presenting valid payment information. It is often realized that the user experience matters the most when it comes to providing a smooth and streamlined experience on a digital platform. With millions of users around the world ordering a subscription, it is of utmost importance that measures are undertaken to make user requests for access as simple and trouble free as possible. Although it is normal to expect system failures, without resilience measures, such failures can negatively impact user satisfaction. Given that technical system failures are not within the control of user(s) 101, the methods described herein take extra measures to resolve such failures without interrupting the user experience.

In addition, when it comes to asynchronously completing a user purchase, in some implementations, user(s) 101 are given temporary access to the network resource that is requested while a retry strategy for the system failure is implemented. For example, the retry strategy may include a jitter-based exponential reactive retry strategy which allows for completing the user purchase in an optimistic manner. As a result, the systems and methods disclosed in the present application advantageously provide authorization of access that may connect authorized users to requested resources, even while critical authorization components are in a degraded state.

Once user(s) 101 has/have made a request for a network resource and any critical system is in a degraded condition, the system computer(s) 102 may grant a temporary entitlement so that user(s) 101 can enjoy the content for a predetermined period of time until the critical components recover or until the failure is resolved. Meanwhile, the user request is retried in the background.

Figure 2:
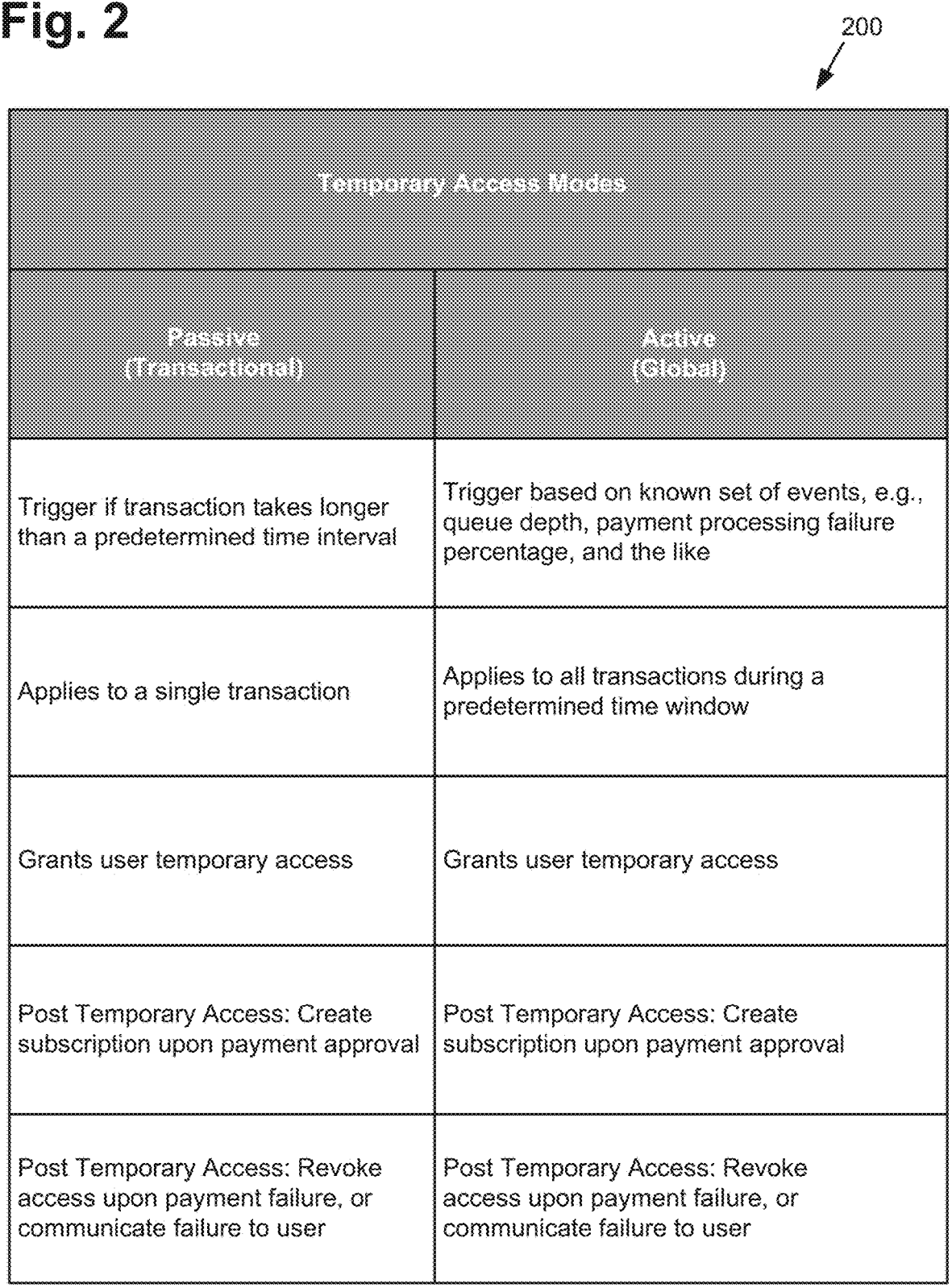
FIG. 2 shows a table of two different exemplary modes of granting temporary access to a network resource.

In one implementation, the temporary access and retry process is performed in a passive mode. In this implementation, each individual requesting user that runs into a failure in the authorization process is granted temporary access and each individual transaction is retried. In another implementation, retries are performed in an active mode or "circuit breaker" mode. For example, a predefined threshold (e.g., 5% of transactions failed) may trigger the circuit breaker (i.e., initiates the temporary access and retry process). As another example, the predefined threshold may include detecting if one transaction amongst the failed transactions has been successfully processed, in which case, retry all other transactions. FIG. 2 shows a table describing the two different modes of granting temporary access.

In one implementation, one or more metrics may be used to determine how many authorization processes should go into temporary access mode. For example, data may be collected to determine how many users have or are currently receiving temporary access. Furthermore, data may be collected regarding which critical components have failed and the reasons that a retry process is currently being executed. In one implementation, an alert may be sent to a service center when a critical authorization computer has failed. However, it is an objective of the methods and systems described herein to troubleshoot in such a manner that does not interfere with the user authorization process or authorized access to the network resource. For example, it may be desired to limit any delays in access to 30 seconds or less.

Figure 3:
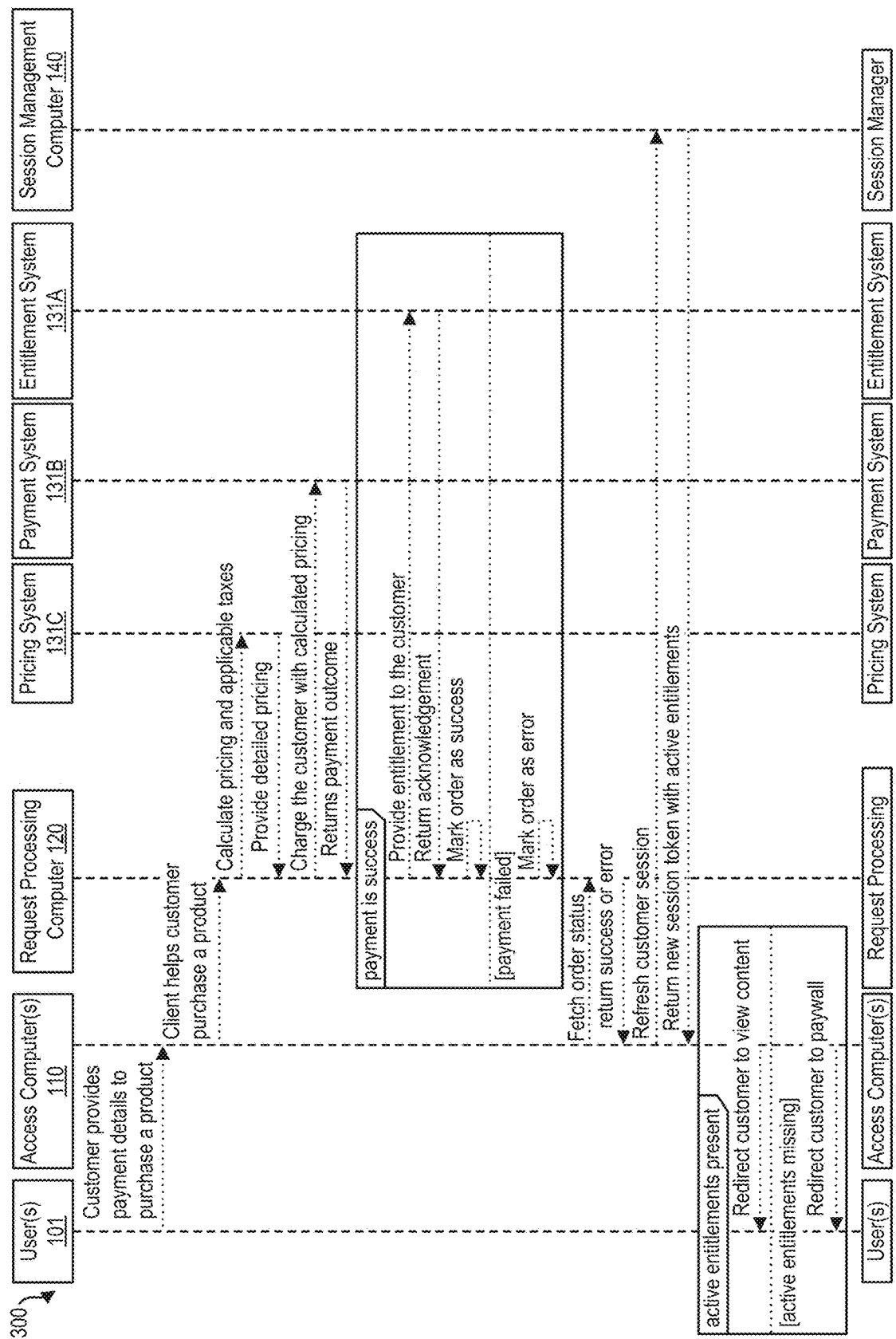
FIG. 3 shows a swim-lane diagram for an exemplary process of granting access to a network resource when an authorization system is in a healthy state according to one implementation.

FIG. 3 shows a swim-lane diagram for a process of granting access when an authorization system is in a healthy state. The reference numbers used in FIG. 3 may correspond to the same entities which are designated by the same reference numbers as they are used in FIG. 1. When the authorization system 100 is in a healthy state (i.e., no critical component failure), the authorization process (e.g., subscription purchase) may be as follows:

The user(s) 101 may provide payment details to purchase a product. For example, the user(s) 101 may enter name, address, payment card information, email address, and other authorization information. These may be entered into the access computer(s) 110. The access computer(s) 110 send the user's purchase order and authorization information to system request processing computer 120 of system computer(s) 102. The request processing computer 120 may then send the purchase order and authorization information to one or more authorization computers. This may include requesting a calculated pricing and applicable taxes from a pricing system 131C and receiving the detailed pricing from the pricing system 131C. This may further include charging the user with calculated pricing at a payment system 131B and receiving a payment outcome. If the payment is a success, the request processing computer 120 requests that an entitlement be provided to user(s) 101 by the entitlement system 131A. An acknowledgment may be returned from the entitlement system 131A. The order may be marked as a success by the request processing computer 120 if the payment is a success, or the order may be marked as an error if the payment failed.

The access computer(s) 110 may fetch an order status from the system computer(s) 102. The system computer(s) 102 may be configured to return the success or error. The access computer(s) 110 may send a message to the session management computer 140 of the system computer(s) 102 to refresh the user session. The system management computer 140 may respond by returning a new session token with active entitlements. If active entitlements are present on the access computer, the user is redirected to view content. If the active entitlements are missing, the user is redirected to a paywall.

Figure 4:
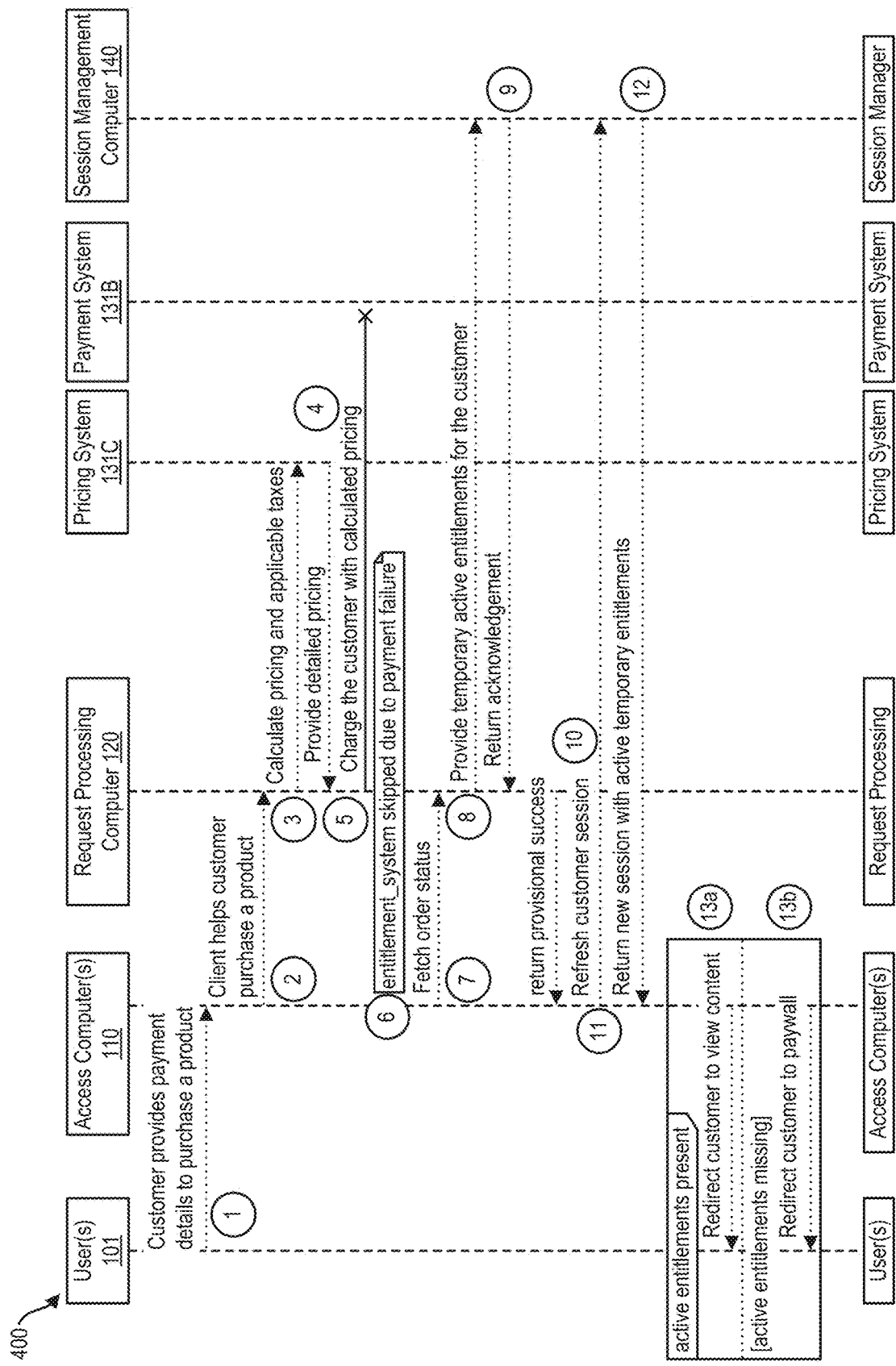
FIG. 4 shows a swim-lane diagram for an exemplary process of granting temporary access to a network resource when an authorization system is in a degraded state.

FIG. 4 shows a swim-lane diagram for a process of granting access when an authorization system is in a degraded state. The reference numbers used in FIG. 4 may correspond to the same entities which are designated by the same reference numbers as they are used in FIGS. 1 and 3. In case of critical dependencies failure, the digital platform provides temporary access. The example illustrated in FIG. 4 shows, for example, when payment system 131B is in a degraded condition.

At step 1, user(s) 101 provide payment details to purchase a product (i.e., the network resource). For example, the user(s) 101 provide product information, purchase information, payment card information, and other authorization information, as similar to the healthy state process from FIG. 3. Similarly, at step 2, the access computer(s) 110 helps the user(s) 101 purchase a product, sending the user's or users' authorization information to the request processing computer 120 of system computer(s) 102. The request processing computer 140 receives the user authorization information from the access computer(s) 110, and initiates an authorization process with the one or more authorization computers using the authorization information of the user. At step 3, the request processing computer 120 requests the pricing system 131C calculate pricing and applicable taxes. At step 4, the pricing system 131C provides detailed pricing to the request processing computer 120.

At step 5, the request processing computer 120 determines a failure occurred at the payment system 131B during the authorization process. As a result, at step 6, the entitlement system 131A is skipped or bypassed during the authorization process. At step 7, the access computer(s) 110 request to fetch an order status (status check request) from the request processing computer 120, and the request processing computer 120 receives the status check request. At step 8, the request processing computer 120 sends a request to the session management computer 140 denoting or indicating that temporary active entitlements be given to the user(s) 101. At step 9, the session management computer 140 returns an acknowledgement (response) to the request processing computer 120, and the request processing computer 120 receives the response. At step 10, the request processing computer 120 returns a provisional success in response to the status check requested by the access computer(s) 110. At step 11, the access computer(s) send a request to refresh the user session to the session management computer 140. At step 12, the session management computer 140 returns a new session, i.e., a second session, with active temporary entitlements, for example in the form of temporary access tokens. The access device(s) 110 may then redirect the user(s) 101 to view content if an active entitlement is present (step 13a), and to redirect the user to a paywall if the active entitlement is missing (step 13b).

In some implementations, once the user(s) 101 placed order is granted temporary access (i.e., receives the temporary access token), the user(s) 101 are free to enjoy the content while the order is flagged as "Temporary Access Order." and the system computer(s) 102 monitor the order and retries the authorization process after a specific period of time. In other implementations, various retry strategies may be implemented, such as those relating to checking system health before retrying. In one implementation, the retry strategy may comprise performing a deep system health check. In another implementation, the retry strategy may comprise verifying a queue depth of incoming processing requests to be within a predetermined threshold before retrying any transaction which went into a temporary access stage. The system computer 102 may wait for a period of time before retrying and may keep on retrying the order/authorization process until it reaches the terminal stage, in which it is indicated whether the user(s) 101 order succeeded or failed.

In one implementation, when the user order succeeds. (e.g., the user payment method is charged successfully), the system computer 102 may provide full access to the requested network resource (e.g., grants entitlement), indicating that the user(s) 101 can benefit from their purchased subscription until a next renewal period when the subscription expires.

In one implementation, when the user order fails (e.g., the user payment method fails), the system 100 may remove the temporary user access, and as a result, the user(s) 101 may be redirected to a new purchase flow for a new order/request to be placed with fresh payment information.

In one implementation, if a user receives temporary access, the temporary access token will be valid for a predefined period of time (e.g., four hours). When the user(s) 101 or the access computer(s) 110 attempt to refresh its current session (refresh token) after the predetermined period of time has passed, the temporary access token will no longer be present on the access computer(s) 110 and will not be replaced upon refresh of the session. i.e., a third session.

In one implementation, the session management computer 140 may deliberately revoke the temporary access token by deliberately sending a signal to the access computer(s) 110 to refresh the session.

In some implementations, the system computer(s) 102 may comprise a plurality of components. The components may be implemented as separate computers within the system computer(s) 102 or as components within a server computer (e.g., as modules of code). The system computer(s) 102 may comprise an order submission service component configured to receive submitted ordered from the access computer(s) 110, an order status service component configured to receive and respond to order status checks from access computer(s) 110, an order processing component configured to initiate and re-initiate (retry) authorization processes for submitted orders, a billing response processing component configured to request grant, denial, and revocation of entitlements based on a success or failure of an authorization process, and an order synchronization component configured to place orders in a queue for retry or re-initialization of an authorization process. The user(s) 101 may communicate with the above mentioned components of the system computer(s) 102 through an access computer or client device, such as access computer(s) 110 in FIG. 1, which may be configured to communicate with the system computer(s) 102 during a user request for access to a network resource. The system computer(s) 102 may be configured to execute a method of granting access to the network resource, as described herein.

Furthermore, the critical authorization computers 131 may comprise a plurality of components. The components may be implemented as separate computers or as components within a server computer (e.g., as modules of code). In some implementations, the critical authorization computers 131 may comprise a subscription component configured to grant entitlements and temporary access tokens, and a price engine service component configured to calculate a price during an authorization process based on a received order. In one implementation, the price engine service component may comprise a catalog service component, a campaign service component, and a taxation service component.

User(s) 101 may submit an order to the order submission service component, and an authorization process may be initiated, which may result in an error or success. Additionally, the order may be checked against a temporary access mode condition, which may be a passive temporary access mode condition. In one implementation, the passive temporary access mode condition may comprise determining if the difference between the current time and the creation time of the order is above a lower threshold and below an upper threshold, and determining the status of the order (e.g., "is the order still in its initial authorization process?"). Additionally, the order may be checked against a re-drive condition or retry authorization condition, which may comprise determining if the difference between the current time and the time of creation of the order is above a re-drive threshold, and determining the status of the order (e.g., "is the order currently in temporary access mode?").

In the present disclosure, reference is made to various implementations. However, it should be understood that the present disclosure is not limited to specific described implementations. Instead, any combination of the following features and elements, whether related to different implementations or not, is contemplated to implement and practice the teachings provided herein. Additionally, when elements of the implementations are described in the form of "at least one of A and B," it will be understood that implementations including element A exclusively, including element B exclusively, and including element A and B are each contemplated. Furthermore, although some implementations may achieve advantages over other possible solutions or over the prior art, whether or not a particular advantage is achieved by a given implementation is not limiting of the present disclosure. Thus, the aspects, features, implementations and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, implementations described herein may be embodied as a system, method or computer program product. Accordingly, implementations may take the form of an entirely hardware implementation, an entirely software implementation (including firmware, resident software, micro-code, and the like) or an implementation combining software and hardware aspects that may all generally be referred to herein as a "circuit." "module" or "system." Furthermore, implementations described herein may take the form of a computer program product implemented in one or more non-transitory computer-readable media having computer-readable program code embodied thereon.

Computer program code for carrying out operations for implementations of the present disclosure may be written in any combination of one or more programming languages, including an object oriented programming language such as Java. Smalltalk, C++ or the like and conventional procedural programming languages, such as the "C" programming language or similar programming languages. The program code may execute entirely on the access computer(s) 110, partly on the access computer(s) 110, as a stand-alone software package, partly on the access computer(s) 110 and partly on a remote computer or entirely on the remote computer or server. In the latter scenario, the remote computer may be connected to the access computer(s) 110 through any type of network, including a local area network (LAN) or a wide area network (WAN), or the connection may be made to an external computer (for example, through the Internet using an Internet Service Provider).

Aspects of the present disclosure are described herein with reference to swim diagrams or block diagrams of methods, apparatuses (systems), and computer program products according to implementations of the present disclosure. It will be understood that each action of the swim diagrams, or block of the block diagrams, and combinations thereof, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the actions of the swim diagrams or the blocks of the block diagrams.

These computer program instructions may also be stored in a non-transitory computer-readable medium that can direct a computer, other programmable data processing apparatus, or other device to function in a particular manner, such that the instructions stored in the computer readable medium produce an article of manufacture including instructions which implement the functions/acts specified in the actions of the swim diagrams or the blocks of the block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the actions of the swim diagrams or the blocks of the block diagrams.

The swim diagram actions and block diagrams in the Figures illustrate the architecture, functionality, and operation of possible implementations of systems, methods, and computer program products according to various implementations of the present disclosure. In this regard, each action of the swim diagrams or the blocks of the block diagrams may represent a module, segment, or portion of code, which comprises one or more executable instructions for implementing the specified logical function(s). It should also be noted that, in some alternative implementations, the functions noted in the action or block may occur out of the order noted in the Figures. For example, two actions or blocks shown in succession may, in fact, be executed substantially concurrently, or the blocks may sometimes be executed in the reverse order or out of order, depending upon the functionality involved. It will also be noted that each action or block of the swim diagrams and block diagrams, and combinations of those actions or blocks, can be implemented by special purpose hardware-based systems that perform the specified functions or acts, or combinations of special purpose hardware and computer instructions.

Thus, the present disclosure relates to methods and systems for resilient authorization of access to network resources that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for use by a system computer for granting access to a network resource, the method comprising:
   receiving, in a first session, a first request for accessing the network resource, the first request comprising first authorization information of a user of an access computer;
   initiating, while in the first session and using the first authorization information, a first authorization process with one or more authorization computers;
   determining a failure relating to the first authorization process initiated with the one or more authorization computers; and
   upon determining the failure, sending a second request indicating a temporary access token is to be delivered to the access computer, the temporary access token to be delivered to the access computer in response to the access computer executing a session refresh for initiating a second session.

2. The method of claim 1, further comprising:
   initiating, using the first authorization information and while being in the second session, a second authorization process with the one or more authorization computers.

3. The method of claim 2, wherein the temporary access token expires after the second session.

4. The method of claim 3, further comprising initiating a third session in response to the access computer executing a subsequent session refresh.

5. The method of claim 4, wherein if the failure is resolved during the second authorization process, an entitlement to the network resource is associated with the user, and the entitlement is sent to the access computer during the third session.

6. The method of claim 4, wherein the user is asked to provide second authorization information during the third session.

7. The method of claim 1, wherein the temporary access token grants access to an additional network resource.

8. The method of claim 1, further comprising:
   receiving, from a plurality of additional access computers, a plurality of additional requests for access to the network resource, each of the plurality of additional requests comprising authorization information of a respective one of a plurality of additional users;
   determining that a failure metric is above a predetermined threshold; and
   upon determining that the failure metric is above the predetermined threshold, obtaining a plurality of temporary access tokens to grant the plurality of additional users the temporary access to the network resource.

9. The method of claim 8, further comprising:
   upon obtaining the plurality of temporary access tokens, initiating a plurality of concurrent authorization processes using the authorization information of the plurality of additional users.

10. The method of claim 9, wherein the plurality of concurrent authorization processes are initiated based on a system health metric or a queue depth threshold.

11. A system for granting access to a network resource, the system comprising:
    a system computer configured to:
    receive, in a first session, a first request for accessing the network resource, the first request comprising first authorization information of a user of an access computer;
    initiate, while in the first session and using the first authorization information, a first authorization process with one or more authorization computers;
    determine a failure relating to the first authorization process initiated with the one or more authorization computers; and
    upon determining the failure, send a second request indicating a temporary access token is to be delivered to the access computer, the temporary access token to be delivered to the access computer in response to the access computer executing a session refresh for initiating a second session.

12. The system of claim 11, wherein the system computer is further configured to:
    initiate, using the first authorization information and while being in the second session, a second authorization process with the one or more authorization computers.

13. The system of claim 12, wherein the temporary access token expires after the second session.

14. The system of claim 13, wherein the system computer is further configured to:
   initiate a third session in response to the access computer executing a subsequent session refresh.

15. The system of claim 14, wherein if the failure is resolved during the second authorization process an entitlement to the network resource is associated with the user, and the entitlement is sent to the access computer during the third session.

16. The system of claim 14, wherein the user is asked to provide second authorization information during the third session.

17. The system of claim 11, wherein the temporary access token grants access to an additional network resource.

18. The system of claim 11, wherein the system computer is further configured to:
   receive, from a plurality of additional access computers, a plurality of additional requests for access to the network resource, each of the plurality of additional requests comprising authorization information of a respective one of a plurality of additional users;
   determine that a failure metric is above a predetermined threshold; and
   upon determining that the failure metric is above the predetermined threshold, obtain a plurality of temporary access tokens to grant the plurality of additional users the temporary access to the network resource.

19. The system of claim 18, wherein the system computer is further configured to:
   upon obtaining the plurality of temporary access tokens, initiate a plurality of concurrent authorization processes using the authorization information of the plurality of additional users.

20. The system of claim 19, wherein the plurality of concurrent authorization processes are initiated based on a system health metric or a queue depth threshold.

* * * * *